Nov. 22, 1966 K. D. BROADBENT 3,287,711
THIN FILM SHIFT REGISTER
Filed Oct. 29, 1962 6 Sheets-Sheet 1
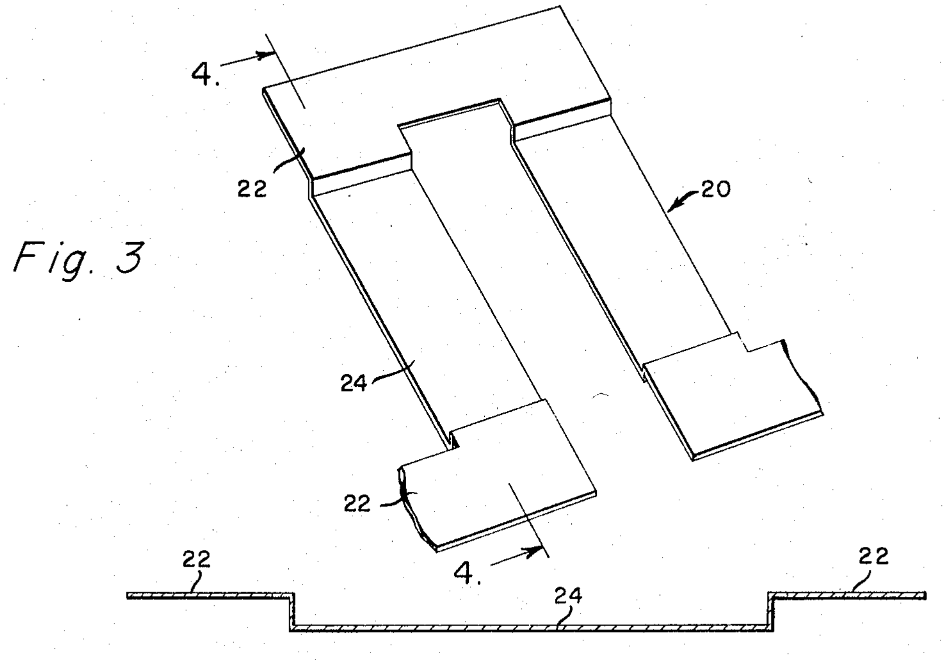
Fig. 3 Fig. 4.
Fig. 1.
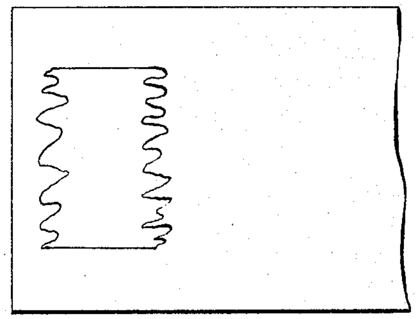
| TIME | FLIP-FLOP 82 | FLIP-FLOP 92 | "AND" GATE |
|---|---|---|---|
| t 1 | 0 | 0 | 104 |
| t 2 | 1 | 0 | 100 |
| t 3 | 0 | 1 | 102 |
| t 4 | 1 | 1 | 98 |
Fig. 12.
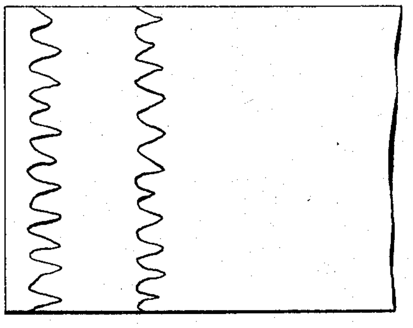
Fig. 2.
Kent D. Broadbent,
INVENTOR.
BY.
Leonard Golove
ATTORNEY.

Nov. 22, 1966 K. D. BROADBENT 3,287,711

THIN FILM SHIFT REGISTER

Filed Oct. 29, 1962 6 Sheets-Sheet 2

Nov. 22, 1966 K. D. BROADBENT 3,287,711

THIN FILM SHIFT REGISTER

Filed Oct. 29, 1962 6 Sheets-Sheet 6

United States Patent Office 3,287,711
Patented Nov. 22, 1966

3,287,711

THIN FILM SHIFT REGISTER

Kent Dastrup Broadbent, San Pedro, Calif., assignor, by mesne assignments, to Interstate Electronics Corporation, a corporation of California Filed Oct. 29, 1962, Ser. No. 233,846
13 Claims. (Cl. 340—174)

This invention relates to a magnetic device and more particularly to a device for shifting the position of a magnetic domain established in a magnetic medium from one portion of the medium to another portion thereof.

Co-pending U.S. patent application Ser. No. 106,612, now Patent 3,092,813 entitled "Magnetic Device," filed May 1, 1961, by Kent D. Broadbent, describes an improved shift register using a magnetic medium having special properties. As discussed in the above described application, when a particular magnetic domain configuration is desired to be transmitted along the magnetic medium, the presence of spurious magnetic domains created by the propagation process will, depending upon the size and location of such domains, cause noise or other inaccuracies in the propagation of information.

These spurious domains have been observed to be formed first at the edges of the magnetic film or medium. This edge formation of spurious domains is believed to be due to the fact that there are free magnetic poles and surface magnetic fields present at the edges of the magnetic film. These free poles and surface fields subject the edges to high local magnetic fields and the formation of microscopic domain configurations apparently results. Such microscopic domains are potential nucleation sources for the formation of micro-domains when propagating magnetic fields are applied. Since there are already magnetic domain walls present in the edge regions, or since walls are quickly formed under the superimposed influence of the local edge fields and the propagating field, macro-domains of the type used to represent legitimate information may result from a wall motion phenomena originating at the edge regions, since the propagating field can initiate wall motion. If micro-domains or relatively high surface magnetic fields can be effectively excluded from the edges of the magnetic medium or film, a much higher propagating field will be required to nucleate spurious domains and effectively higher propagating fields may be used, since spurious domains could only be formed by an internal rotational process which requires a much higher coercing field. Thus, higher speed of operation and a greater margin of safety in construction and operation of the device will have been achieved. Thus suppression of the nucleation of domains formed at the edges of the magnetic medium or film yields a substantial improvement in the operation of magnetic domain propagation devices.

In the above described patent application, domain wall motion was eliminated at the edges of the information channels by magnetically hardening these edges so that the coercive force required to move the magnetic domain walls at the edges was well above any propagating coercive fields that would be applied during the operation of the device.

The present invention teaches novel and improved means for shaping the propagating magnetic field. These means provide the same advantages in the operation of the shift register as described above, in connection with the use of edge hardening without requiring edge hardening of the magnetic medium as taught in the patent application described above. If, as was the case of the device described in the prior application, one assumes that the propagating structures will be uni-planar, uniform cross-section structures overlying the entire plane of the information bearing channels, then magnetic hardening of the edges of the magnetic medium accomplishes the objective of preventing spurious domain walls which are generally present at the edges of the magnetic medium from moving under the influence of the propagating fields.

The present invention teaches that domain wall motion at the edges of the information channels may be eliminated by proper shaping of the propagating field such that the applied propagating field will have a value sufficient to move magnetic domains in the information bearing portion of the channel and such that the propagating field will decrease at the edges of the information bearing portion of the magnetic medium below that value required to move domain walls. Thus in a magnetic medium or strip of uniform magnetic characteristics (without edge hardening) the propagating magnetic field may be shaped such that it exceeds the values required to move domain walls (information) in the information bearing portion of the magnetic medium but falls below the value required to move magnetic domain walls at the edge of the information bearing portion of the magnetic medium, where spurious domain walls are present and represent unwanted signals or noise, if allowed to move. In effect then, larger propagating magnetic fields may be used, since the use of the larger fields in the information channel will no longer tend to create noise or unwanted signals in the edge regions.

The present invention then teaches that the propagating magnetic field may be altered to provide a field, which, as described above, has a relatively high value in the information bearing portion of the channel and a relatively low value at the edges or non-information bearing portion of the channel. The necessary field shaping may be accomplished by the use of certain novel shapes of the propagating elements which will be described in detail hereinafter. Field shaping may also be accomplished by the use of a pair of electrically conducting layers placed adjacent portions of the magnetic medium. These conducting layers operate as an effective magnetic shield with respect to rapidly changing propagating magnetic fields. Thus, the propagating fields are reduced at the edges of the information bearing portion of the channel, as required for proper operation. This structure also will be described in detail hereinafter.

Shaping of the propagating elements, as described above, may be accomplished by providing elements which are shaped such that they are relatively close to, that is, at a minimum separation from the information bearing portion of the magnetic medium, and are relatively far from, that is, have a maximum separation from all non-information bearing portions of the magnetic medium. Thus the use of a multi-planar, uniform cross-section, propagating structure overlying the entire plane of the information bearing channel will provide the necessary field shaping.

Alternatively, a uni-planar, non-uniform cross-section propagating structure overlying the plane of the information bearing channel may also be used. In this embodiment, propagating elements having non-uniform width are used to produce propagating magnetic fields in accordance with the requirements of the present invention.

As has been stated above, the introduction of a pair of conducting layers adjacent the magnetic medium at the edges thereof may also provide field shaping even though a uni-planar, uniform cross-section, propagating structure is used.

The details of construction of shift registers utilizing propagating fields shaped according to the principles of the present invention will be described in detail below.

Accordingly it is an object of the present invention to provide a novel and improved device for moving magnetic domains in a magnetic medium.

Another object of this invention is to provide a magnetic shift register which is relatively simple to construct and which allows latitude in the magnetic properties of the magnetic medium and further allows latitude in the thicknesses and uniformity required of the magnetic medium.

Still another object of this invention is to provide an improved magnetic shift register which is capable of operating at considerably higher speeds than prior art devices.

A further object of this invention is to provide an improved magnetic shift register using non-uniform propagating magnetic fields.

A still further object of this invention is to provide an improved magnetic shift register using a multi-planar, uniform cross-section propagating element.

Another and further object of this invention is to provide an improved magnetic shift register using a uniplanar, non-uniform cross-section propagating element.

An additional object of this invention is to provide an improved magnetic shift register using a uni-planar, uniform cross-section propagating structure and further employing a pair of conducting layers for providing shaping of the propagating magnetic field.

Further and additional objects will become apparent from a study of the following specification and drawings in which:

FIG. 1 shows an idealized magnetic domain impressed upon the magnetic medium or film described above.

FIG. 2 shows a magnetic domain impressed upon a magnetic layer as produced by the uniform propagating magnetic field taught by the prior art.

FIG. 3 is a perspective view of a portion of a propagating element manufactured according to one embodiment of the present invention.

FIG. 4 is a cross-sectional view taken along the line 2—2 of FIG. 1.

Figure 5:
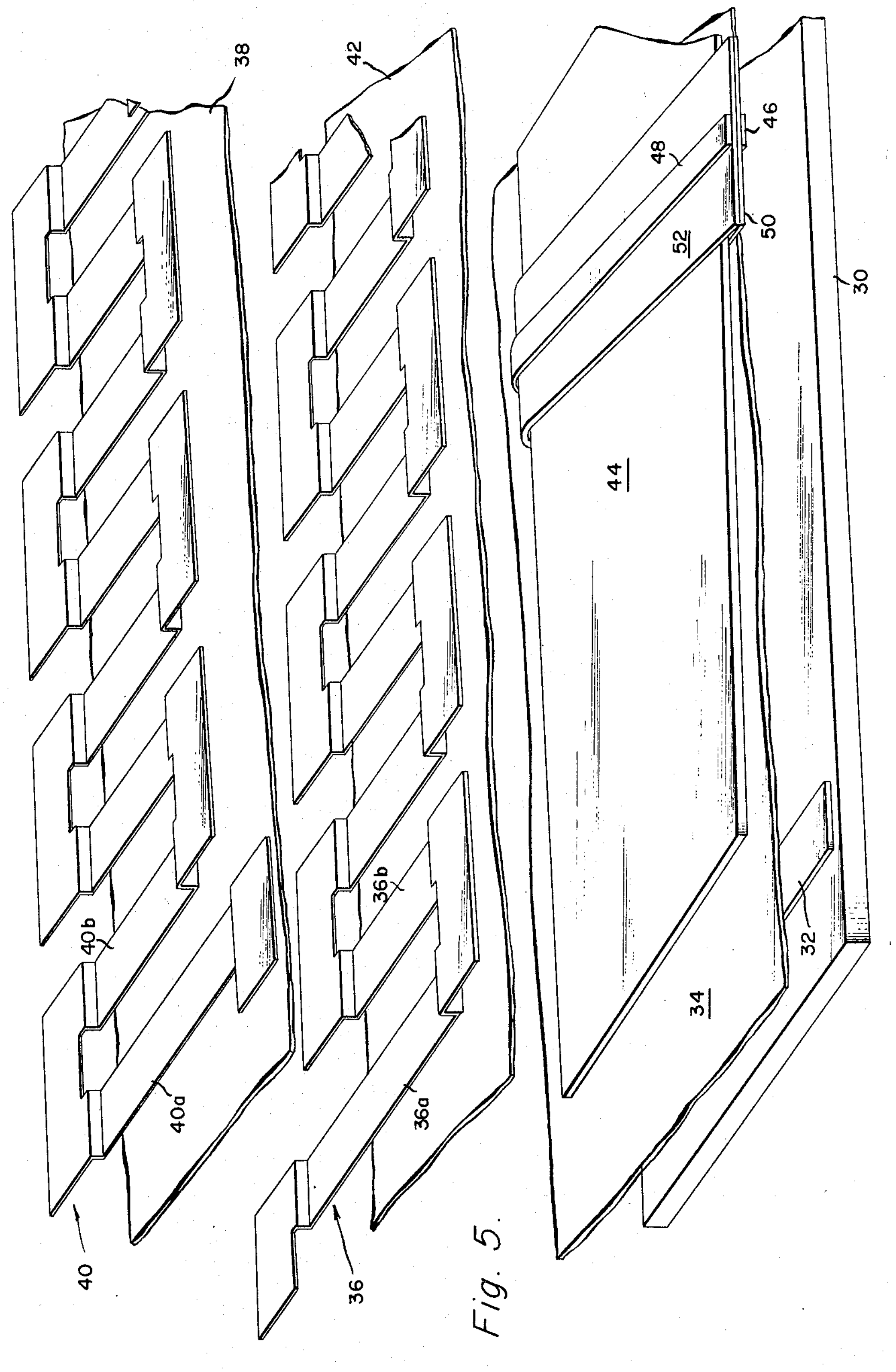
FIG. 5 is a distorted, idealized, exploded and enlarged view of the thin film layers comprising a first embodiment of the present invention and indicating a sequential order of deposition.
Figure 6:
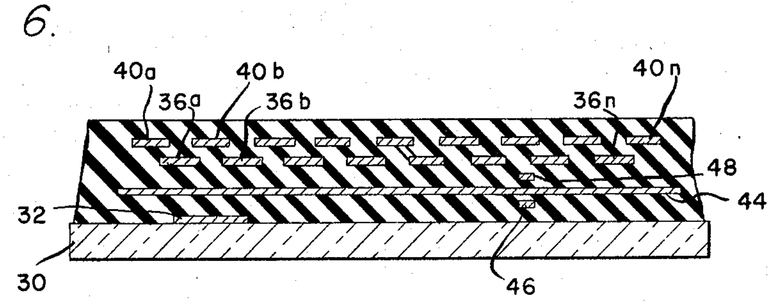
FIG. 6 is an idealized, enlarged vertical sectional view of a portion of the device shown in FIG. 5.
Figure 9:
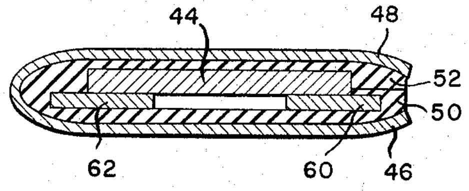
FIG. 9 is a cross-sectional view of a portion of the embodiment of FIG. 8 showing the magnetic layer and a pair of conducting layers adjacent thereto.
Figure 8:
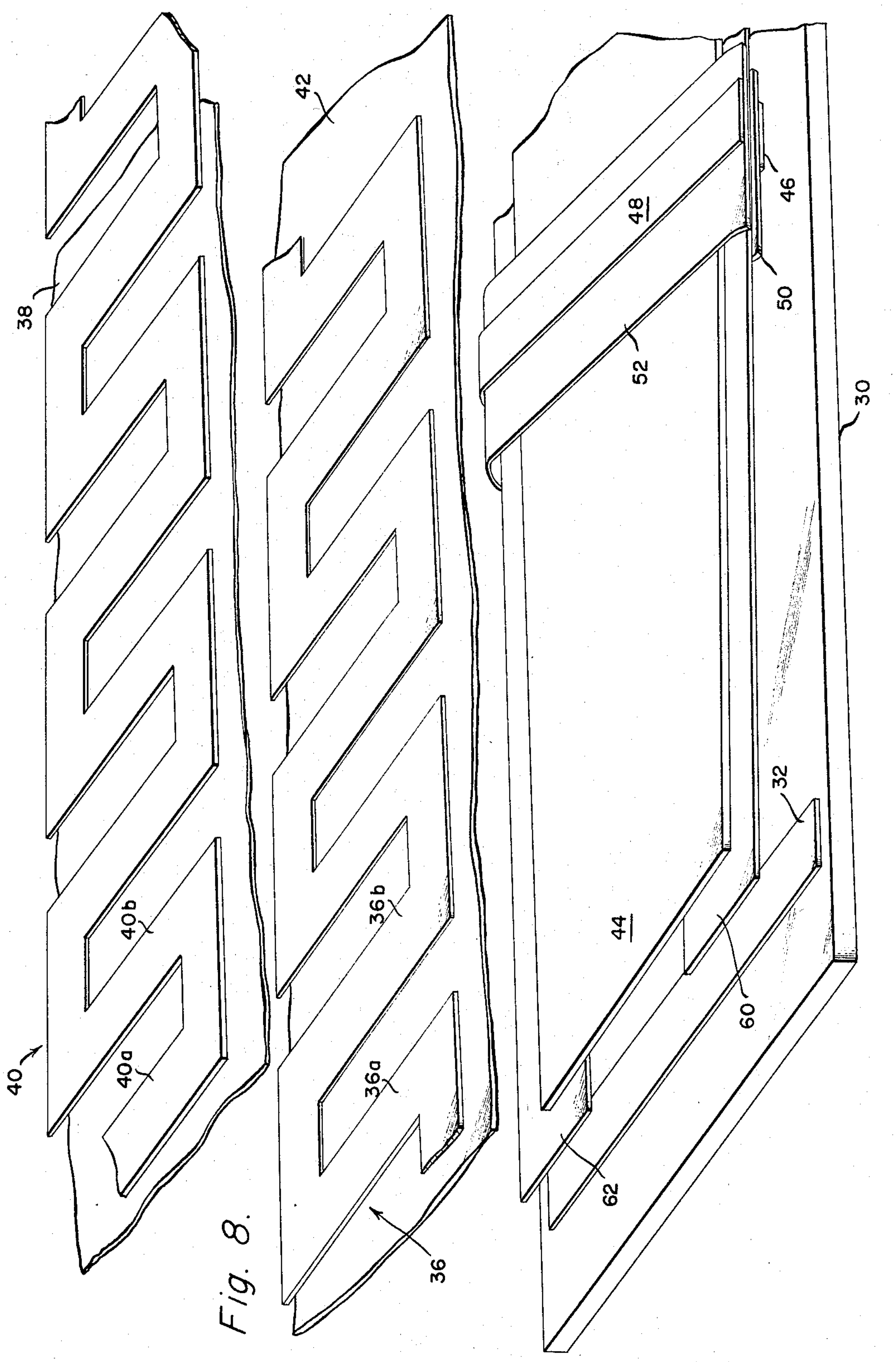
FIG. 8 is a distorted, idealized, exploded and enlarged view of the thin film layers comprising a third embodiment of the present invention and indicating a sequential order of deposition.

FIGS. 10*a*–10*j* are idealized, enlarged, vertical sectional views of the magnetic device of FIGS. 5 and 6 or of the device of FIGS. 8 and 9, showing the operation of the device.

Figure 11:
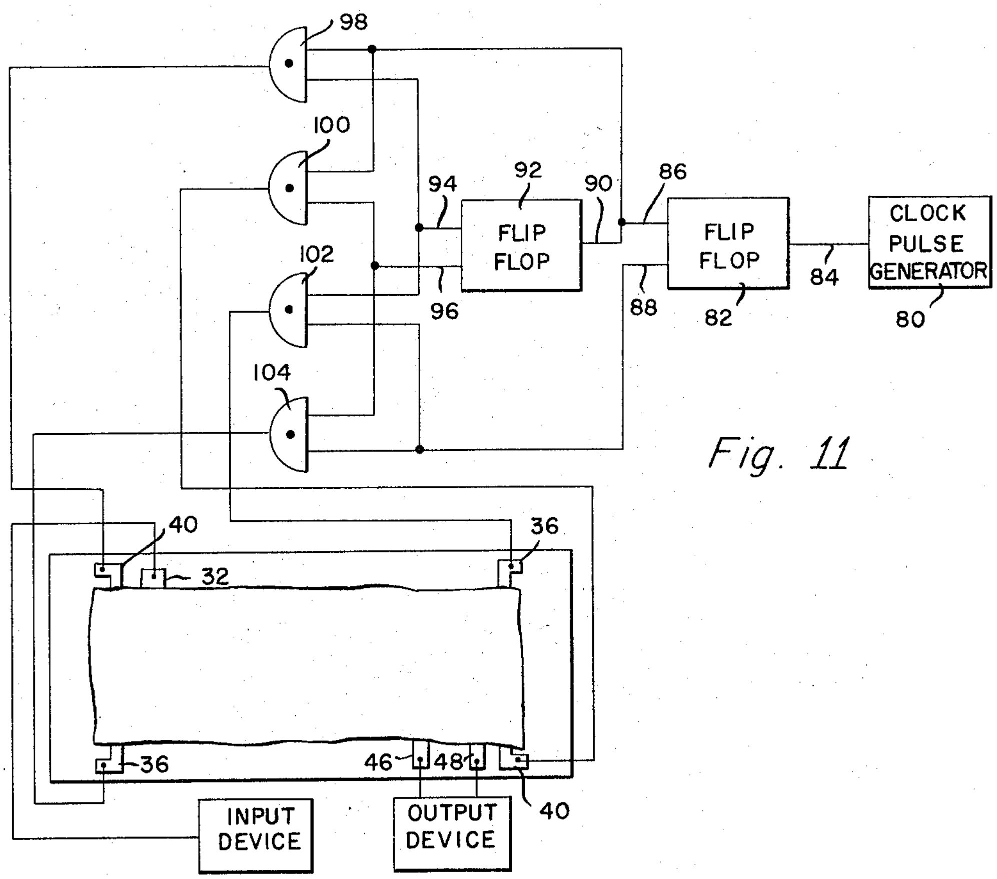

FIG. 11 is a circuit diagram showing the device of FIGS. 5 and 6 or of the device of FIGS. 8 and 9, in an operative circuit; and FIG. 12 is a table showing the energization of various portions of the circuit of FIG. 8.

Turning now to FIG. 1, there is shown an idealized information bearing magnetic zone or domain as it might be found on the magnetic medium or film comprising a portion of the present invention. It can be seen that the domain only exists in the information channel of the magnetic film.

FIG. 2 shows a magnetic zone which has been impressed onto a magnetic film manufactured according to the principles of the prior art. Note that the zone extends to the edges of the magnetic film.

In all of the descriptions of the operation of the magnetic devices which have been given heretofore and which are to follow, it is to be understood that, while the explanations given appear to be reasonably and qualitatively correct, the description of the magnetization phenomena is highly simplified for the purpose of clarity in explanation. In actuality, magnetic domain formation and interaction is known to be extremely complex and the simple explanation offered herein may not fully describe the operation of this invention. It should be further understood that the simplified description of the magnetization phenomena presently believed to account for the operation of this invention is merely supplied for explanatory purposes and that the utility of the invention does not depend upon the accuracy of those principles suggested.

Referring now to FIGS. 3 and 4, there is shown a portion of one of the propagating electrodes forming a portion of the present invention. In these figures, as in all of the figures accompanying the present invention, various dimensions have been distorted so that the details of the invention can be clearly seen. In FIGS. 3 and 4, a portion of a propagating electrode 20 having a U-shape, can be seen to comprise a multi-planar, uniform cross-section structure. The propagating electrode 20 is divided into two portions, edge portions 22 and central portion 24. Since the propagating element 20 overlays the entire plane of the uni-planar magnetic layer of film, it may be see that the central portion 24 of the propagating element 20 will be relatively close to the magnetic layer and that the edge portions 22 of the propagating element 20 will be relatively far from the magnetic layer. Thus, magnetic fields produced by the central portion 24 will have a relatively high value in the information bearing channel or portion of the magnetic layer and a relatively low value at the edges or non-information bearing portions of the magnetic layer. Thus the use of a propagating element shaped according to the principles shown in FIGS. 1 and 2, produces the necessary propagating magnetic field alteration to provide operation of the shift register as described hereinabove.

Referring now to FIGS. 5 and 6, there is shown a thin film shift register constructed according to the principles of the present invention. The device shown may be manufactured by successive applications of a vacuum deposition technique in which each of the respective magnetic, insulative and conductive layers shown in FIGS. 5 and 6 are superimposed in an appropriate order. The magnetic layer shown therein may be composed of permalloy or other suitable material and may have a thickness of approximately 1000 A. The conductive layers may be composed of aluminum and the insulative layers of silicon dioxide. The thickness of the conductive and insulative layers may be approximately 10,000 A.

The thickness of the magnetic film layer is goverened at the lower limit by the disappearance of ferro-magnetic properties while self-demagnetizing effects and the appearance of significant eddy current losses at the relatively high frequencies used in digital computing devices govern the upper limit of said thickness. Since much of the structure shown in FIGS. 5 and 6 is composed of thin films, a carrier or sub-strate 30 is required. The choice of a suitable sub-strate is made according to considerations reported and discussed in an article in the Journal of Applied Physics, vol. 26, August 1955, which is entitled "Preparation of Thin Magnetic Films and Their Properties," by M. S. Blois, Jr., at pp. 975–980. For the purposes of this invention, a suitable sub-strate has been found to be commercially available soft glass which is an insulative medium as required. However, other insulating materials able to withstand higher temperatures may be used.

Upon the sub-strate 30 there is deposited a plurality of conductive, insulative, and magnetic layers which will be described in detail below. With respect to the various conductive layers, it should be pointed out that their order is not critical and can be varied without impairment of the functioning of the device.

The first layer to be deposited is an input electrode which is a conducting layer 32, rectangular in shape, which is used to impress a stable antiparallel magnetic domain in the magnetic layer to be described. Above the conducting layer 32, an insulating layer 34 is deposited. The insulating layer 34 must have a size and shape designed to prevent electrical contact between the conducting layer 32 and the various conducting and magnetic layers which will be superimposed thereupon. Above the insulating layer 34 is superimposed a magnetic layer 44, rectangular in shape, which extends across the entire length of the device. Around the magnetic layer 44 is looped an output winding, composed of conducting layers 46 and 48, each rectangular in shape, and deposited such that electrical contact is made between the lower layer 46 and the upper layer 48 at one end of each of these layers. The conducting layers 46 and 48 are prevented from making electrical contact with the magnetic layer 44 and between themselves, except at said one end, by an insulating layer 50 deposited between conducting layer 46 and magnetic layer 44, and an insulating layer 52 deposited between magnetic layer 44 and conducting layer 48.

Above the magnetic layer 44 and the conducting layers 46 and 48 is deposited an insulating layer 42, which must prevent electrical contact between these layers and superimposed conducting layers. Above the insulating layer 42 is superimposed a pair of propagating electrodes 36 and 40, which may be composed of thin sheets of metal foil which has been shaped as described above, separated by an insulating layer 38, which is shaped to prevent electrical contact between the propagating electrodes 36 and 40. The propagating electrodes 36 and 40, which are formed of conducting materials, have already been described, in part, in connection with the description of FIGS. 3 and 4, described above. Referring to FIGS. 5 and 6, the propagating electrodes 36 and 40 comprise a plurality of parallel electrode portions **36*a*, 36*b* . . . 36*n*, and 40*a*, 40*b* . . . 40*n*, extending transversely across the magnetic medium to be described. The electrode portions are electrically connected to form a continuous conductor in a zig-zag pattern such that current in adjacent electrode portions flows in opposite directions. Thus, a current applied to electrode 36 will pass through each of electrode portions 36*a*, 36*b* . . . 36*n*, such that current flows in opposite directions in portions 36*a* and 36*b*, etc. and similarly a current applied to electrode 40 will pass through each of the portions 40*a*, 40*b* . . . 40*n*, such that current flows in opposite directions in portions 40*a* and 40*b*, etc. The width of each of the electrode portions must be approximately one half the width of a stable magnetic domain indicating either a binary "1" or a binary "0." Contiguous electrode portions such as 36*a* and 40*a* may effectively overlap as shown in FIG. 6, although such overlap is not required due to fringing fields associated with the electrodes. The read-in electrode, conducting layer 32, may have a width approximately twice that of a propagating electrode portion, such as 36*a*, or less. If a width less than approximately twice that of a propagating electrode portion is used, actuation of the input electrode 32 nucleates a magnetic domain which grows to full size, that is, approximately twice the width of an electrode portion, under the influence of the propagating fields produced by the electrodes 36 and 40**. Although the dimensions given and configurations shown form a preferred embodiment of the present invention, other embodiments utilizing similar principles of operation can be made using other electrode configurations.

Figure 7:
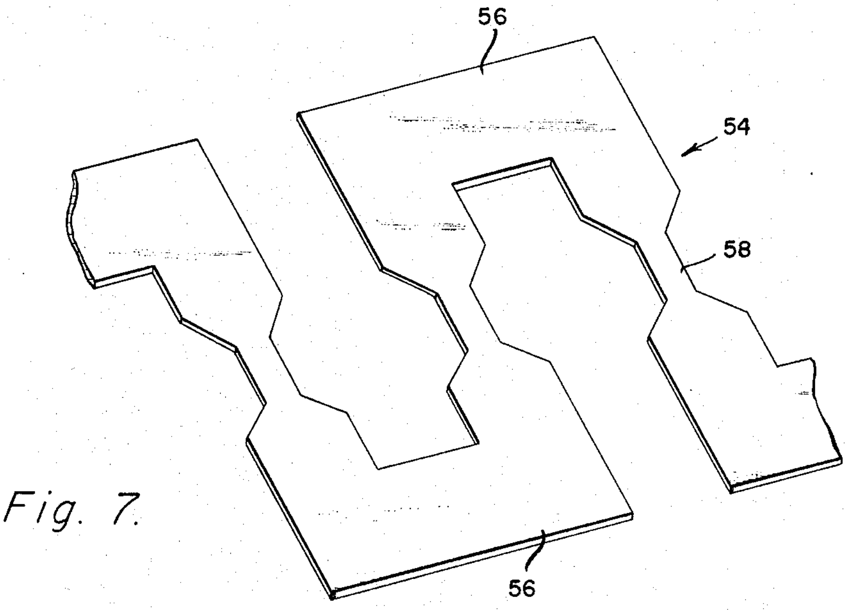
FIG. 7 is a perspective view of a portion of one of the propagating elements manufactured according to a second embodiment of the present invention.

Referring now to FIG. 7, there is shown a portion of another form of propagating electrode which may be used in place of the electrodes 36 and 40, shown in FIGS. 5 and 6. In FIG. 7, a portion of a propagating electrode designated generally as electrode 54, can be seen to be a uni-planar, non-uniform cross-section structure. The propagating electrode 54 is divided into two portions, edge portions 56 and a central portion 58. Since the propagating electrode 54 overlays the entire plane of the uni-planar magnetic layer or film, it may be seen that the central portion 58 of the propagating electrode 54 has a width which is relatively small with respect to the width of the edge portions 56 of the propagating electrode 54.

Since the magnetic field produced by a relatively thin electrical conductor is proportional to the current density within the conductor, it is evident that the relatively thin central portion 58 will produce a magnetic field which has a relatively high value with respect to the magnetic field produced by the edge portions 56. Thus, magnetic fields produced by the propagating electrode 54 will have a relatively low value at the edges or non-information bearing portions of the magnetic domain. It is evident, then, that the use of a propagating electrode or element shaped according to the principles shown in FIG. 7 produces the necessary propagating magnetic field alteration to provide operation of the shift register as described hereinabove. A second embodiment of the shift register may be produced by replacing the type of propagating element shown in FIGS. 3 and 4, with the type of propagating element shown in FIG. 7, in the shift register shown in FIGS. 5 and 6. This alternative embodiment of the present invention yields approximately the same alteration of the propagating field as does the embodiment shown in FIGS. 3 and 4.

FIGS. 8 and 9 show the details of construction of a shift register comprising still another embodiment of the present invention. In this embodiment the necessary shaping of the propagating magnetic field is accomplished by the introduction of a pair of rectangularly shaped conducting layers 60 and 62, extending longitudinally along the magnetic layer 44 in the edge regions of the magnetic film, as shown. The conducting layers 60 and 62 must be placed immediately adjacent the magnetic layer 44. Although in FIGS. 8 and 9, the conducting layers 40 and 62 are shown immediately below the magnetic layer 44, this is for convenience in description only, and these conducting layers could, with increased efficiency, be placed immediately above the magnetic layer 44. It should also be noted that the output winding, comprising the conducting layers 46 and 48, is, in the embodiment shown in FIGS. 8 and 9, looped around the magnetic layer 44 and the conducting layers 60 and 62. While this arrangement has been found to be operative, the output winding may alternatively be looped solely around the magnetic layer 44.

The effect of the juxtaposition of the conducting layers 60 and 62, as described above, is to shape the propagating magnetic field produced by the uni-planar, uniform cross-section propagating elements shown in FIG. 8, to produce virtually the same propagating magnetic field which is produced by shaping the propagating electrodes as shown in either FIGS. 3 and 4, or in FIG. 7. This magnetic field shaping produced by the conducting layers 60 and 62 is apparently explained by the following effect. The propagating magnetic field produced by a uni-planar uniform cross-section electrode produces a magnetic flux which penetrates the magnetic layer 44 in a relatively even distribution along the width of the magnetic layer 44. However, the penetrating flux generates a flow of eddy currents in the conducting layers 60 and 62. These eddy currents, in turn, produce a magnetic image of the penetrating flux, cancelling out the effect of the penetrating flux at those portions of the magnetic layer 44 adjacent the conducting layers 60 and 62. In effect then, a relatively low value of propagating magnetic field is generated at the edges of non-information bearing portions of the magnetic layer 44 and a relatively high value of the propagating magnetic field is generated in the information bearing portion of the magnetic layer 44. Thus, the introduction of the conducting layers 60 and 62 produces the necessary propagating magnetic field alteration to provide operation of the shift register as described hereinabove.

Since the induced shielding eddy currents decay in shielding strips 60 and 62 having finite resistivity, this mode of field shaping is effective only with rapidly changing propagating currents or with shielding strips having zero resistance (superconductors).

The operation of the shift registers shown in FIGS. 5 and 6, and in FIGS. 8 and 9, is described below with reference to FIGS. 10*a*–10*j*. With reference to the embodiment shown in FIGS. 5 and 6, it is to be understood that either propagating electrodes constructed according to the principles shown in FIGS. 3 and 4, or constructed according to the principles shown in FIG. 7 may be used without difference in the operation of the shift register. It should also be understood that the operation of the embodiment of the shift register shown in FIGS. 8 and 9 is identical to the operation of the embodiment of the shift register shown in FIGS. 5 and 6.

Figure 10:
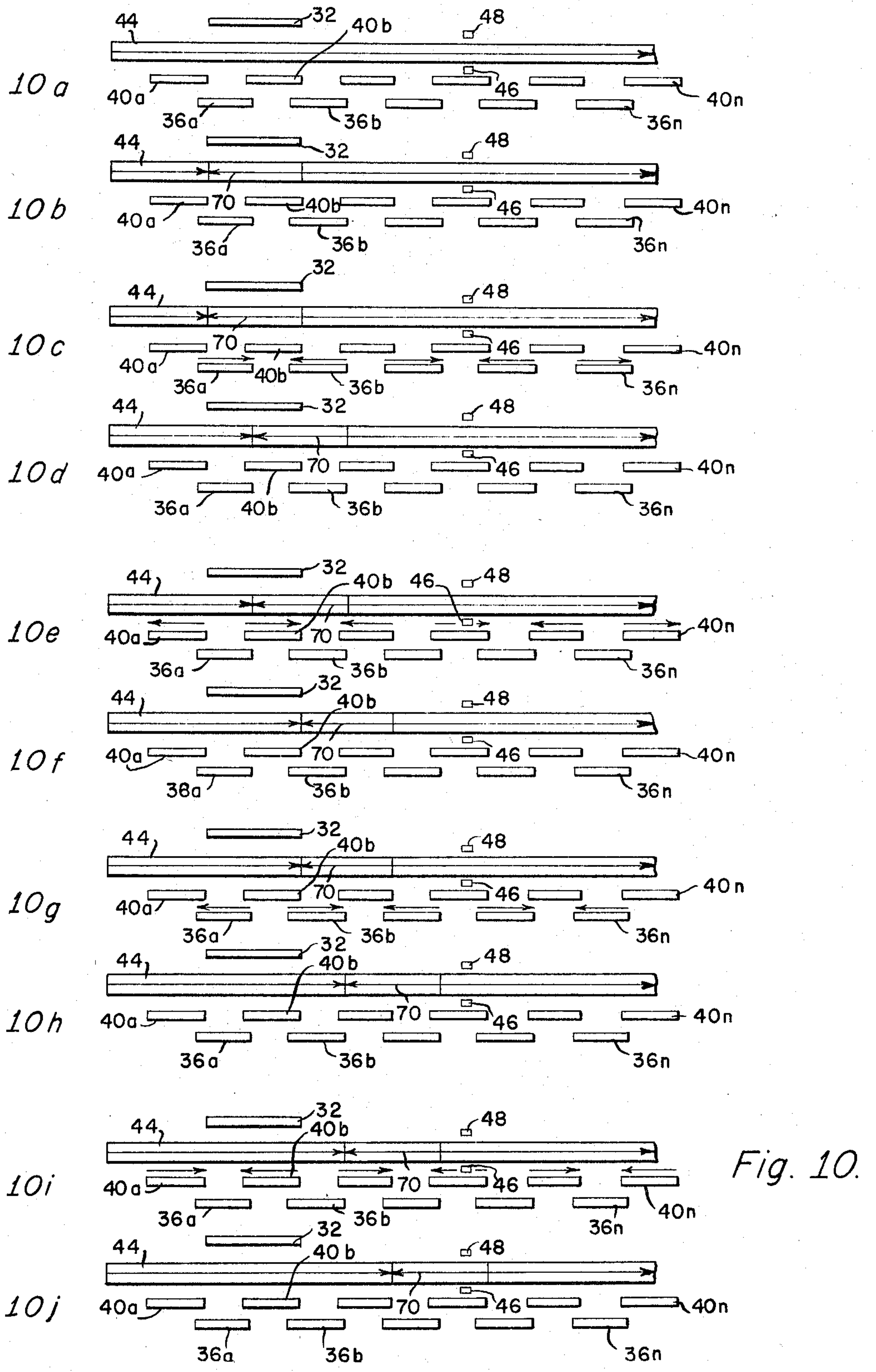

FIGS. 10*a*–10*j* are schematic representations of a longitudinal cross-section taken through the device of FIGS. 5 and 6, or through the device of FIGS. 8 and 9, at various times during the operation of the shift register. Note that the conductor 32 is shown above the magnetic layer 44 rather than below that layer. This change is made merely for the purpose of explanatory convenience, and to show a satisfactory alternative arrangement. FIG. 10*a* shows the initial condition of the magnetic medium 44, in which the medium is shown magnetized in a first direction as a single magnetic domain. Binary information will be represented on the medium by considering that an area of magnetization of the medium 44 in a first direction (shown to the right in FIG. 10, denotes a binary "0," and by considering that an area of magnetization of the medium 44 in an opposite or antiparallel direction, denotes a binary "1."

In order to record binary information on the medium 44, current is passed through the conductor 32. The passage of current through the conductor 32 causes a magnetic field to appear around the conductor, which field will tend to magnetize the portion of the magnetic layer 44 adjacent the conductor 32. By controlling the direction of current in the conductor 32, magnetization may be induced, in the portion of the magnetic layer 44 adjacent the conductor 32, in either said first direction or said antiparallel direction. In order to record a binary "1," current must be passed through the conductor 32 in such a direction as to cause a magnetic field to pass through the medium in an antiparallel direction, as shown in FIG. 10*a*. A binary "0" can be recorded either by passing current through the conductor 32 in the opposite direction or by not supplying current to the conductor 32, since the magnetic layer 44 has an initial magnetization in the "0" direction.

The area of antiparallel magnetization produced by appropriate energization of the conductor 32 will be stable and will remain after the inducing current is removed from the conductor 32. FIG. 10*b* shows the condition of the medium after current has been removed from the conductor 32. It can be seen in FIG. 10*b* that a stable area of an antiparallel state of magnetization 70 has been created in the magnetic medium 44.

FIGS. 10*c*–10*j* show the condition of the magnetic medium and the conditions of the electrodes 36 and 40 at various times between the recording of information by the input electrode 32 and the read-out of information by the output electrode, conductors 46 and 48. FIG. 10*c* shows the first step in a motion cycle which involves actuating the electrode 36 by passing current through the entire electrode 36 in a first direction. From the shape of the electrode shown and described in connection with FIGS. 5 and 6, it can be seen that if electrode portion **36*a* is producing a magnetic field of a first direction, then electrode portion 36*b* will be producing a magnetic field of an antiparallel direction and successive electrode portions (36*c*, 36*d* . . . 36*n*) will produce magnetic fields of alternately opposite directions. This is evident from the fact that the electrode is constructed so that current passes in a first direction in the first electrode portion 36*a*** and in an opposite direction in each of the succeeding electrode portions. FIG. 10*c* then shows the actuation of the electrode 36 by the passage of current through the electrode in the first direction. From considerations given above, it can be seen that both boundaries of the antiparallel zone 70 shown in FIG. 10*c* will move from the position shown in FIG. 10*c* to the position shown in FIG. 10*d*.

Referring to FIG. 10*c*, it should be noted that the magnetic layer 44 is provided with an initial state of magnetization as shown in FIG. 10*a* by an arrow pointing to the right. A stable antiparallel magnetic domain or zone 70 is then created as shown in FIGS. 10*a* and 10*b*. This zone may be propagated or shifted along the magnetic film 44 by setting up a suitable coercing magnetic field sufficient to allow the zone to move within the magnetic film but not sufficient to create a new zone. The propagation of the zone results from the passage of current through the electrodes 36 and 40 in a particular manner which will be described below, and by control of the magnitude of electric current allowed to flow through the propagating electrodes 36 and 40. In FIG. 10*c*, it can be seen that the electrode portion **36*a*** has been provided with electric current resulting in a magnetic field shown to the right in FIG. 10*c*. The electrode portion **36*b*** has been provided with electric current resulting in a magnetic field, shown to the left in FIG. 10*c*. As has been described above, passage of current through the electrode 36 will result in opposite directions of magnetic field in adjacent electrode portions, such as portions **36*a* and 36*b*. The magnetic field produced by the propagating electrode portions 36*a* and 36*b* will result in motion of the antiparallel zone 70** to the position shown in FIG. 10*d* since the magnetization of the electrode portion **36*a* will cause movement of the left boundary of the antiparallel zone 70 and the energization of the electrode portion 36*b* will cause the motion of the right boundary of the antiparallel zone 70** to the positions shown in FIG. 10*d*.

It should be noted that other electrode portions, such as the electrode **36*n*, will also tend to create zones which would be reversed in magnetization from the adjacent portion of the magnetic layer 44. However, since the coercing forces supplied by the propagating electrode portions 36*a* . . . 36*n* are less than that coercing force required to create a magnetic domain or zone in the absence of a domain wall, no stable magnetization of the magnetic layer 44 which might tend to be created, will actually appear when the current is removed from the propagating electrode portions 36*a*–36*n***.

As has been discussed above, it is the structure of the propagating electrodes, as shown in FIGS. 3 and 4, or in FIG. 7; or the addition of conducting layers 60 and 62, shown in FIGS. 8 and 9, which provide the shaping of the propagating magnetic field which ensures that portions of the propagating electrodes 36 and 40 will not create stable magnetic domains at locations, such as adjacent electrode portion **36*n* in the magnetic layer 44, which are not adjacent already existing domain walls. It is the disadvantage of the prior art that, because of the relatively small ratio of creation field to propagation field, undesired stable magnetic domains tend to be created in the magnetic layer 44 by the action of the propagating electrodes and errors in the information carried in the magnetic layer 44** result. Conversely, by the use of a shaped propagating magnetic field as taught herein, the creation of undesired stable magnetic domains and consequent computational errors are avoided even when larger propagating fields than the minimum required for propagation are used in an effort to obtain higher progagation speeds. Thus, the present invention teaches means for avoiding errors while actually achieving increased speed of operation.

During the next step in the motion cycle, the electrode 40 is actuated by passing current through the electrode in the first direction. This passage of current produces opposite magnetic fields at each of the adjacent electrode portions and causes the motion of the stable magnetic zone 70 from the position shown in FIG. 10*e* to the position shown in FIG. 10*f* as described above. During the next interval of the motion cycle, the electrode 36 is again actuated but in the opposite direction, producing a movement of the stable antiparallel magnetic domain or zone 70 from the position shown in FIG. 10*g* to the position shown in FIG. 10*h*, as described in connection with FIGS. 10*c* and 10*d*. During the last portion of the motion cycle, the electrode 40 is actuated in the opposite direction, producing a movement of the stable antiparallel magnetic zone 70 from the position shown in FIG. 10*i* to the position shown in FIG. 10*j*.

During this portion of the motion cycle, it can be seen that the stable antiparallel magnetic zone 70 has passed under the output winding composed of conductors 46 and 48. Since a change in magnetization has occurred in an area enclosed by an output winding, an output pulse will appear across the conductors 46 and 48. This output pulse can be used to determine the condition or direction of magnetization of the medium. Thus, a shift register has been described. It can be seen that the output winding can be placed wherever desired to yield any desired time delay and that a shift register of any length may be fabricated. It should be appreciated also that while the description above only included a single input pulse, in practice, a succession of pulses representing binary numbers, would, in fact, be used. Thus, some time after a first antiparallel magnetic domain has been moved out of the input area, as shown in FIG. 10*h*, a second antiparallel domain may be created in the medium. Thus, a series of domains may be created and propagated. This required time spacing is approximately equal to the width of a stable domain.

The circuitry for supplying the proper energization of the propagating electrodes 36 and 40 will now be described with reference to FIG. 11. This circuitry must supply, at a first time, an electric current of a first direction to the electrode 36. At a second time, electric current of the first direction must be supplied to the electrode 40. At a third time, electric current of a second (opposite) direction must be supplied to the electrode 36. At a fourth time, electric current of the second direction must be supplied to the electrode 40.

One embodiment of circuitry which will supply the above-defined currents comprises a clock pulse generator 80 which supplies a series of electrical pulses. The clock pulse generator 80 is connected to a first flip-flop 82, which is of the type having a single input 84 and two complementary outputs 86 and 88. As is well known in the art, such a flip-flop will change state whenever it receives an input pulse. Thus, upon receiving a first pulse, the output 86 assumes a relatively low voltage. Upon receiving a second pulse, the output will be reversed; that is, the output 86 will assume a relatively high voltage. Upon receiving each successive pulse, the status of the outputs 86 and 88 will correspondingly reverse.

The output 86 is connected to input 90 of a second flip-flop 92, which has outputs 94 and 96. The flip-flop 92, which operates upon a decrease in voltage, will change state, that is, the relative voltages of its outputs, whenever the output 86 of the flip-flop 82 changes its state from a relatively high voltage to a relatively low voltage. Such a change of state of the flip-flop 92 occurs upon every second clock pulse supplied to the flip-flop 82. Thus, if we consider that a first clock pulse sets both flip-flops 82 and 92 to a condition in which the outputs 86 and 94 are both relatively low, the second clock pulse will set the flip-flop 82 to a condition in which the output 86 is relatively high and will not affect the flip-flop 92, leaving the output 94 in a low state. A third clock pulse will set the flip-flop 82 to a condition in which the output 86 is relatively low and will set the flip-flop 92 to a condition in which the output 94 is relatively high. A fourth clock pulse will set the flip-flop 82 to a condition in which the output 84 is relatively high and will not affect the flip-flop 92, leaving the output 94 in a high state. A fifth clock pulse will set both outputs 86 and 94 to a relatively low condition, initiating another cycle.

The output 86 of flip-flops 82 and 94 of flip-flop 93 are connected to the inputs of a first conventional "and" gate 98. The outputs 86 of flip-flop 82 and 96 of flip-flop 92 are connected to the input of a second "and" gate 100. The output 88 of the flip-flop 82 and the output 94 of the flip-flop 92 are connected to the inputs of a third "and" gate 102. The output 88 of the flip-flop 82 and the output 96 of the flip-flop 92 are connected to the inputs of a fourth "and" gate 104.

In FIG. 12, column I identifies the particular times constituting an operating cycle of the propagating electrodes 36 and 40. Column II shows the state of the flip-flop 82, a "0" representing a relatively low voltage at the output 86 and a relatively high voltage at output 88, and a "1" representing a relatively high voltage on the output 86 and a relatively low voltage on the output 88. Column III shows the state of the flip-flop 92 with "0" representing a state in which output 94 has a relatively low voltage and output 96 has a relatively high voltage, and "1" representing a state in which output 94 has a relatively high voltage and output 96 has a relatively low voltage.

Since, in general, an "and" gate will provide a relatively high voltage at its output only when all of its inputs are supplied with a relatively high voltage, column IV shows which of the "and" gates will provide a relatively high voltage at its output for each of the four possible states of the flip-flops 82 and 92. It can be seen that only one "and" gate can possibly provide a relatively high voltage at a particular time and that the other "and" gates have a relatively low voltage on other outputs. Thus, at time "1" the "and" gate 104 has a relatively high voltage and is connected to one terminal of the propagating electrode 36. A return path is provided from the other terminal of the propagating electrode 36 to the "and" gate 102 which has a relatively low voltage at its output. At time "2" the "and" gate 100 is connected to one terminal of the propagating electrode 40 and supplies a relatively high voltage to its terminal. The return path is provided from the other terminal of the propagating electrode 40 to the "and" gate 98 which has a relatively low voltage at its output. At time "3," a relatively high voltage is supplied by the "and" gate 102 to one terminal of the propagating electrode 36 which has a return path from its opposite terminal to the "and" gate 104. At time "4," a relatively high voltage is supplied by the "and" gate 98 to one terminal of the propagating electrode 40 which has a return path from its opposite terminal to the "and" gate 100. It can be seen that the directions of current produced by the voltages described provide proper actuation of the propagating electrodes.

The vacuum evaporation technique employed in constructing this novel magnetic element is conventional and well-known in the art. Sufficient to say for the purpose of this invention that the magnetic element may be built up by the sequential evaporation of each thin film layer by means of an individual mask having the configuration of the desired layer to be deposited. However, thin film devices may also be produced by other techniques than vacuum deposition. For example, the required configuration of conducting, insulating and magnetic films may be produced by other processes or combinations of processes as electro-deposition, electrophoresis, silkscreening techniques, or various inking, sketching, and printing techniques which allow thin planes of materials to be defined, registered, and applied upon a subsurface.

It should be noted that the dimensions given hereinabove for the various thin film layers are not to be construed as limited thereto but are merely indicative of preferable structure compatible with thin film considerations. The order of depositing the various conductive layers may also be varied from the order described.

It will now be appreciated that a novel and approved thin film magnetic element has been disclosed. This element may employ a pair of propagating electrodes as shown, or it may be constructed with a pair of propagating electrodes on each side of the magnetic layer. In such a case, electrode 36 would have an associated electrode disposed in vertical alignment with and in electrical continuity with the electrode 36. Similarly, the electrode 40 would have an associated electrode disposed in vertical alignment with and in electrical continuity with the electrode 40. The use of a pair of electrodes should provide sharper and better defined magnetized zones.

While the operation of the device as a shift register has been shown in a four-beat cycle, it should be understood that other cycles containing different numbers of beats (electrode actuation patterns) may be used.

What is claimed is:

1. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means magnetically coupled to said magnetic medium at a first predetermined place thereof for establishing in said magnetic medium an area of a second state of magnetization, output means responsive to the state of magnetization of said magnetic medium at a second predetermined place thereof spaced from said first predetermined place by a continuous portion of said magnetic medium, and means magnetically coupled to said magnetic medium along said continuous portion thereof, for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portions of said magnetic medium.

2. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means responsive to electrical signals and magnetically coupled to said magnetic medium at a first predetermined place thereof for establishing in said magnetic medium an area of a second state of magnetization in accordance with said electrical signals, output means responsive to the state of magnetization of said magnetic medium at a second predetermined place thereof spaced from said first predetermined place by a continuous portion of said magnetic medium for providing electrical signals in accordance with said state of magnetization, and means magnetically coupled to said magnetic medium along said continuous portion thereof for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portions of said magnetic medium.

3. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means magnetically coupled to said magnetic medium at a first predetermined place thereof for establishing in said magnetic medium an area of a second state of magnetization, output means responsive to the state of magnetization of said magnetic medium at a second predetermined place thereof spaced from said first predetermined place by a continuous portion of said magnetic medium, and means magnetically coupled to said magnetic medium along said continuous portion thereof for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portions of said magnetic medium, said magnetic field producing means being arranged and defined with respect to said magnetic medium to be effective to shift the position of said area in steps.

4. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means magnetically coupled to said magnetic medium at a first predetermined place thereof for establishing in said magnetic medium an area of a second state of magnetization, output means responsive to the state of magnetization of said magnetic medium at a second predetermined place thereof spaced from said first predetermined place by a continuous portion of said magnetic medium, and a plurality of propagating electrodes magnetically coupled to said magnetic medium along said continuous portion thereof for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portion of said magnetic medium, each of said electrodes arranged to be effective upon energization thereof to produce a coercive force in said medium on overlapping portions of said medium.

5. A magnetic device according to claim 4 and including a first source of electric current adapted to be coupled to said input means and providing electric current of magnitude sufficient to establish a stable zone of magnetization within said medium and a second source of electric current adapted to be controllably coupled to said propagating electrodes.

6. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means magnetically coupled to said magnetic medium at a first predetermined place thereof for establishing in said magnetic medium an area of a second state of magnetization, output means responsive to the state of magnetization of said magnetic medium at a second predetermined place thereof spaced from said first predetermined place by a continuous portion of said magnetic medium, and a plurality of propagating electrodes magnetically coupled to said magnetic medium along said continuous portion thereof for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portions of said magnetic medium, each of said electrodes arranged to be effective upon energization thereof to produce a coercive force in said medium on overlapping portions of said medium and each of said propagating electrodes comprising a plurality of electrically connected conducting portions extending transversely across said medium and in which each of said conducting portions is a multi-planar, uniform cross-section element.

7. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means magnetically coupled to said magnetic medium at a first predetermined place thereof for establishing in said magnetic medium an area of a second state of magnetization, output means responsive to the state of magnetization of said magnetic medium at a second predetermined place thereof spaced from said first predetermined place by a continuous portion of said magnetic medium, and a plurality of propagating electrodes magnetically coupled to said magnetic medium along said continuous portion thereof for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portions of said magnetic medium, each of said electrodes arranged to be effective upon energization thereof to produce a coercive force in said medium on overlapping portions of said medium and each of said propagating electrodes comprising a plurality of electrically connected conducting portions extending transversely across said medium and in which each of said conducting portions is a multi-planar, uniform cross-section element and is shaped to provide minimum separation from said inner portion of said magnetic medium and maximum separation from said edge portions of said magnetic medium.

8. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means magnetically coupled to said magnetic medium at a first predetermined place thereof for establishing in said magnetic medium an area of a second state of magnetization, output means responsive to the state of magnetization of said magnetic medium at a second predetermined place thereof spaced from said first predetermined place by a continuous portion of said magnetic medium, and a plurality of propagating electrodes magnetically coupled to said magnetic medium along said continuous portion thereof for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portions of said magnetic medium, each of said electrodes arranged to be effective upon energization thereof to produce a coercive force in said medium on overlapping portions of said medium and each of said propagating electrodes comprising a plurality of electrically connected conducting portions extending transversely across said medium and in which each of said conducting portions is a uniplanar, non-uniform cross-section element.

9. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means magnetically coupled to said magnetic medium at a first predetermined place thereof for establishing in said magnetic medium an area of a second state of magnetization, output means responsive to the state of magnetization of said magnetic medium at a second predetermined place thereof spaced from said first predetermined place by a continuous portion of said magnetic medium, and a plurality of propagating electrodes magnetically coupled to said magnetic medium along said continuous portion thereof for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portions of said magnetic medium, each of said electrodes arranged to be effective upon energization thereof to produce a coercive force in said medium on overlapping portions of said medium and each of said propagating electrodes comprising a plurality of electrically connected conducting portions extending transversely across said medium and in which each of said conducting portions is a uni-planar non-uniform cross-section element having a pair of relatively wide portions adjacent said edge portion of said medium and a relatively narrow portion adjacent said inner portion of said medium.

10. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means magnetically coupled to said magnetic medium at a first predetermined place thereof for establishing in said magnetic medium an area of a second state of magnetization, output means responsive to the state of magnetization of said magnetic medium at a second predetermined place thereof spaced from said first predetermined place by a continuous portion of said magnetic medium, a plurality of propagating electrodes magnetically coupled to said magnetic medium along said continuous portion thereof for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portions of said magnetic medium, each of said electrodes arranged to be effective upon energization thereof to produce a coercive force in said medium on overlapping portions of said medium, and a pair of conducting elements extending longitudinally along said magnetic medium and adjacent said edge portions of said medium.

11. A magnetic device according to claim 10 and including a first source of electric current adapted to be coupled to said input means and providing electric current of magnitude sufficient to establish a stable zone of magnetization within said medium and a second source of electric current adapted to be controllably coupled to said propagating electrodes.

12. A magnetic device comprising an elongated magnetic medium having a pair of edge portions comprising areas extending longitudinally along the edges of said medium and an inner portion extending longitudinally along said medium between said edge portions, said inner portion having a first state of magnetization, input means responsive to electrical signals and magnetically coupled to said magnetic medium at a first predetermined place thereof for establishing in said magnetic medium an area of a second state of magnetization in accordance with said electrical signals, output means responsive to the state of magnetization of said magnetic medium at a second predetermined place thereof spaced from said first predetermined place by a continuous portion of said magnetic medium for providing electrical signals in accordance with said state of magnetization, and means magnetically coupled to said magnetic medium along said continuous portion thereof for producing a shaped magnetic field adapted to move the area of said second state of magnetization from said first predetermined place to said second predetermined place on said magnetic medium within said continuous portion thereof, said magnetic field having a relatively high value in said inner portion and a relatively low value in said edge portions of said magnetic medium, said magnetic field producing means comprising a plurality of propagating electrodes magnetically coupled to said magnetic medium along said continuous portion thereof, each of said propagating electrodes comprising a plurality of electrically connected conducting portions extending transversely across said medium and in which each of said conducting portions is a uni-planar, uniform cross-section element, and a pair of conducting elements extending longitudinally along said magnetic medium and adjacent said edge portions of said medium.

13. A magnetic device according to claim 12 and including a first source of electric current adapted to be coupled to said input means and providing electric current of magnitude sufficient to establish a stable zone of magnetization within said medium and a second source of electric current adapted to be controllably coupled to said propagating electrodes.

No references cited.

TERRELL W. FEARS, *Acting Primary Examiner.*